United States Patent
Karmakar

(10) Patent No.: US 9,528,056 B2
(45) Date of Patent: Dec. 27, 2016

(54) INTEGRATED GASIFIER AND SYNGAS COOLER

(71) Applicant: General Electric Company, Schenectady, NY (US)

(72) Inventor: Pallab Karmakar, Gobardanga (IN)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 14/242,408

(22) Filed: Apr. 1, 2014

(65) Prior Publication Data

US 2015/0275110 A1    Oct. 1, 2015

(51) Int. Cl.
| | |
|---|---|
| *C10J 3/56* | (2006.01) |
| *C10K 1/04* | (2006.01) |
| *C10J 3/86* | (2006.01) |
| *C10J 3/76* | (2006.01) |
| *C10J 3/26* | (2006.01) |
| *C10J 3/48* | (2006.01) |

(52) U.S. Cl.
CPC .. *C10J 3/86* (2013.01); *C10J 3/26* (2013.01); *C10J 3/76* (2013.01); *C10K 1/04* (2013.01); *C10J 3/482* (2013.01); *C10J 3/56* (2013.01); *C10J 2300/0906* (2013.01); *C10J 2300/0959* (2013.01); *C10J 2300/1603* (2013.01); *C10J 2300/1653* (2013.01); *C10J 2300/1678* (2013.01); *C10J 2300/1884* (2013.01); *Y02E 20/18* (2013.01); *Y10T 29/49826* (2015.01)

(58) Field of Classification Search
CPC ............ C10J 3/86; C10J 3/76; C10J 3/26; C10J 2300/0906; C10J 2300/1653; C10J 2300/1678; C10J 2300/1884; C10J 3/482; C10K 1/04

See application file for complete search history.

(56) References Cited

U.S. PATENT DOCUMENTS

| | | |
|---|---|---|
| 3,838,666 A | 10/1974 | Smith |
| 4,272,255 A | 6/1981 | Coates |
| 5,713,312 A | 2/1998 | Waryasz |
| 7,730,616 B2 | 6/2010 | Goller et al. |
| 7,931,710 B2 | 4/2011 | Alexander |
| 7,934,383 B2 | 5/2011 | Gutierrez et al. |
| 2008/0041572 A1 | 2/2008 | Wessel et al. |
| 2009/0038155 A1 | 2/2009 | Corry |

(Continued)

FOREIGN PATENT DOCUMENTS

WO    2009014802 A1    1/2009

OTHER PUBLICATIONS

Invitation to Pay Additional Fees issued in connection with corresponding PCT Application No. PCT/US2015/022109 dated May 26, 2015.

(Continued)

*Primary Examiner* — Matthew Merkling
(74) *Attorney, Agent, or Firm* — Fletcher Yoder, P.C.

(57) ABSTRACT

A system includes an integrated vessel that extends along a longitudinal axis. The integrated vessel includes a gasifier portion and a syngas cooler portion. The syngas cooler portion is disposed axially adjacent to the gasifier portion along the longitudinal axis. The integrated vessel also includes platen tubes that extend from the syngas cooler portion into the gasifier portion. The platen tubes are configured to route coolant through the integrated vessel.

20 Claims, 5 Drawing Sheets

(56) References Cited

U.S. PATENT DOCUMENTS

| | | | |
|---|---|---|---|
| 2009/0199474 A1* | 8/2009 | Leininger | C10J 3/52 48/69 |
| 2010/0313442 A1 | 12/2010 | Russell et al. | |
| 2011/0243804 A1 | 10/2011 | Steinhaus | |
| 2012/0005959 A1 | 1/2012 | Chen et al. | |
| 2012/0111009 A1 | 5/2012 | Corry et al. | |

OTHER PUBLICATIONS

PCT Search Report and Written Opinion issued in connection with corresponding Application No. PCT/US2015/022109 on Aug. 24, 2015.

* cited by examiner

INTEGRATED GASIFIER AND SYNGAS COOLER

BACKGROUND

The subject matter disclosed herein relates generally to a system and method for gasification systems (e.g., integrated gasification combined cycles, or IGCCs) and gasification components. More particularly, the disclosed subject matter relates to gasifiers and syngas coolers of gasification systems.

Gasification systems generally include a gasifier that reacts a feedstock, such as coal, with an oxidant and a moderator (e.g., steam) to generate a syngas. The syngas may be used as a fuel for a downstream system, such as a gas turbine engine. The syngas may also be used for chemical production. Unfortunately, the syngas generally exits the gasifier at a high temperature. Depending on the downstream application of the syngas, the syngas may be cooled in a syngas cooler downstream from the gasifier. The syngas cooler may occupy a significant amount of space relative to the gasifier.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an integrated vessel that extends along a longitudinal axis. The integrated vessel includes a gasifier portion and a syngas cooler portion. The syngas cooler portion is disposed axially adjacent to the gasifier portion along the longitudinal axis. The integrated vessel also includes platen tubes that extend from the syngas cooler portion into the gasifier portion. The platen tubes are configured to route coolant through the integrated vessel.

In a second embodiment, a system includes a gasifier and a syngas cooler. The syngas cooler is disposed axially adjacent to the gasifier along a longitudinal axis. The system also includes a support ring assembly configured to support an intake header. Further, the gasifier, the syngas cooler, and the support ring assembly are integrated into a common vessel.

In a third embodiment, a method of manufacture includes integrating a gasifier in a first portion of a common vessel and integrating a syngas cooler in a second portion of the common vessel axially adjacent to the first portion along a longitudinal axis of the common vessel. The method of manufacture also includes providing platen tubes within the common vessel, where the platen tubes extend from the first portion of the common vessel into the second portion of the common vessel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
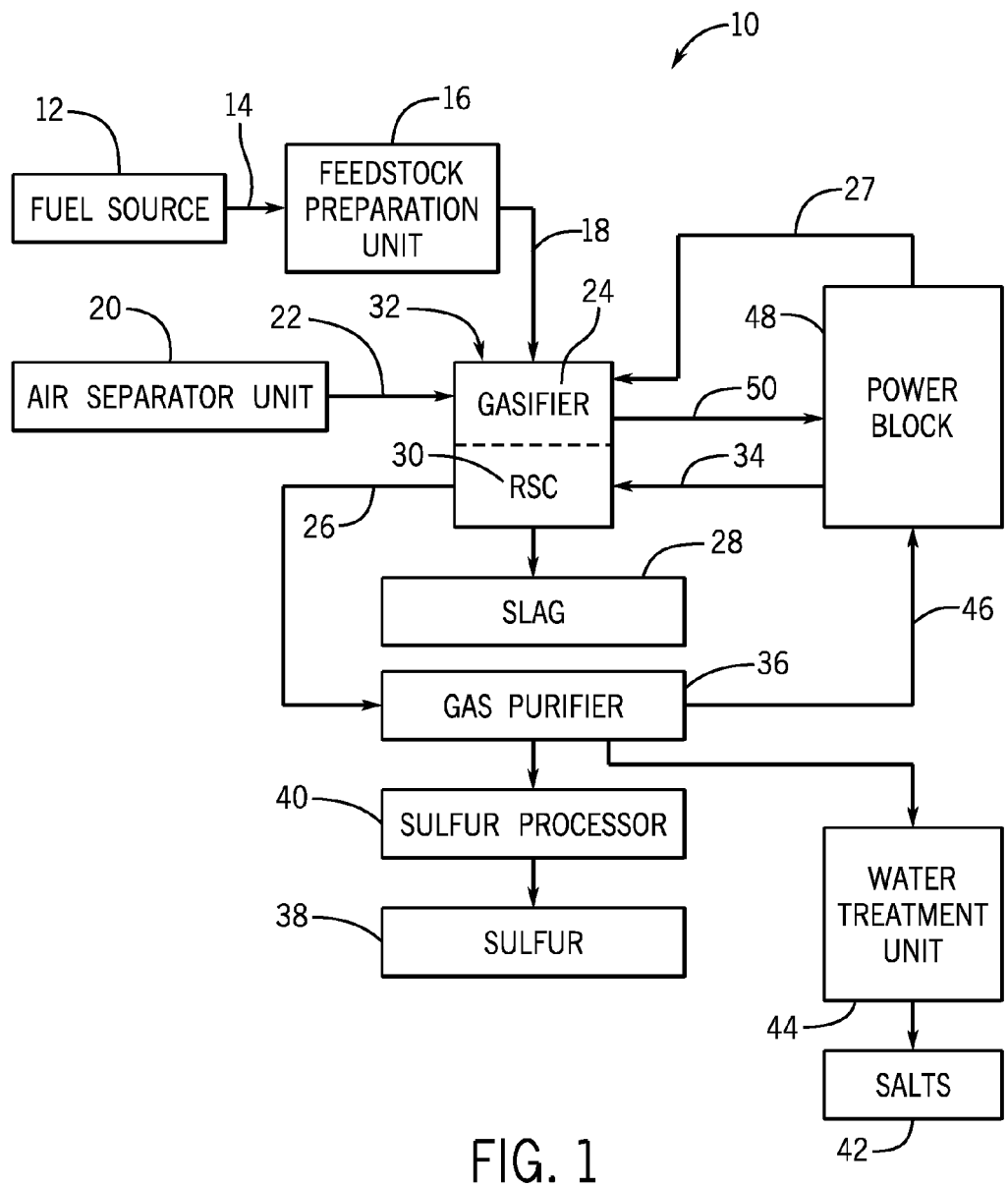
FIG. 1 is a schematic block diagram of an embodiment of a portion of a gasification system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present disclosure is directed toward gasification components and systems. Specifically, the present disclosure includes an integrated gasifier and syngas cooler (e.g., integrated into the same vessel). The syngas cooler may be a radiant syngas cooler (RSC), a quench cooler, or any other type of cooler (e.g., heat exchanger). Radiant syngas coolers, or RSCs, generally receive syngas produced by high temperature, non-combustive reaction of a fuel mixture in the gasifier, and cool the syngas via a coolant (e.g., cooling water) routed through platen and membrane tubes in the RSC. Heat may be extracted from the syngas, via radiant and/or convective heat transfer, by the cooling water to generate two-phase saturated steam and cooled syngas. The two-phase saturated steam and cooled syngas may be exported separately to one or more other portions of the gasification system for further use. For example, the syngas may be treated to remove sulfur and transmitted to a power block, where the power block may include a combustor for combusting the syngas to generate combustion products. The combustion products may be utilized by a turbine engine for power generation, e.g., an electrical generator driven by a turbine. Additionally, the syngas can be utilized to produce chemicals in methanol-to-olefins (MTO) or substitute natural gas (SNG) plants. Additionally, the two-phase saturated steam may be exported to a heat recovery steam generator of the power block, and the heat recovery steam generator may provide steam to a steam turbine engine for power generation, e.g., an electrical generator driven by a steam turbine.

The embodiments of the gasification system described herein employ the integrated gasifier and radiant syngas cooler. For example, the gasifier and RSC may be integrated linearly into a single vessel (e.g., the gasifier above the RSC). In certain embodiments, the gasifier and RSC may be axially disposed along a longitudinal axis (e.g., in a non-coaxial arrangement). The platen and membrane tubes in the RSC may extend into the gasifier to generate a more efficient and thorough heat transfer between the syngas produced in the gasifier and the cooling water routed through the platen and membrane tubes. Additionally, with the improved heat transfer efficiency, the integrated gasifier and RSC may be capable of generating superheated steam. Further, because there may be a close proximity between the gasifier and the RSC by integrating the two (e.g., the gasifier and RSC are each a part of a single vessel), the platen and membrane tubes may extend into the gasifier without an actual increase in the length of the RSC, which may be fabricated from costly Inconel alloys or other expensive material(s), or of the platen and membrane tubes. As such, there may be a substantial decrease in production cost of the, relative to gasification systems that include a separate RSC and gasifier.

Turning now to the figures, FIG. 1 is a block diagram showing an embodiment of a portion of an integrated gasification combined cycle (IGCC) system 10, or gasification system, having a gasifier that may produce a syngas and a syngas cooler, e.g., radiant syngas cooler (RSC), that may cool the syngas. In the illustrated embodiment, the gasifier and the radiant syngas cooler are integrated linearly into a single vessel as described above. Elements of the IGCC system 10 may include a fuel source 12 of a fuel 14 that may be utilized as a source of energy for the IGCC system 10. The fuel 14 may include coal, petroleum coke, biomass, wood-based materials, agricultural wastes, tars, coke oven gas, asphalt, heavy residues from a refinery, natural gas or other carbon containing items.

The fuel 14 from the fuel source 12 may be passed to a feedstock preparation unit 16. The feedstock preparation unit 16 may, for example, resize or reshape the fuel 14 from the fuel source 12 by chopping, milling, shredding, pulverizing, briquetting, or pelletizing the fuel 14 to generate feedstock 18. Accordingly, the feedstock preparation system 14 may include one or more grinders, mills, or any similar unit that may produce smaller particles from large particles of the fuel 14 during operation. Additionally, water, or other suitable liquids may be added to the fuel 14 in the feedstock preparation unit 16 to create slurry feedstock. In other embodiments, no liquid is added to the fuel 14, thus yielding dry feedstock. In further embodiments, the feedstock preparation unit 16 may be omitted if the fuel 14 is a liquid or gas.

The IGCC or gasification system 10 may further include an air separation unit (ASU) 20. The ASU 20 may operate to separate air into component gases by, for example, distillation techniques. The ASU 20 may separate oxygen 22 from the air supplied to it from a supplemental air compressor, and the ASU 20 may transfer the separated oxygen 22 to a gasifier 24 (or gasifier portion).

The feedstock 18, and in certain embodiments, the oxygen 22 from the ASU 20, may be passed to the gasifier 24 (e.g., a partial oxidation vessel) from the feedstock preparation unit 16. The gasifier 24 may include a reactor or a reaction chamber disposed in a gasification vessel to enable gasification to produce a syngas 26. The gasifier 24 may convert the feedstock 18 into the syngas 26, e.g., a combination of carbon monoxide (CO) and hydrogen. This conversion may be accomplished by subjecting the feedstock 18 to a controlled amount of steam 27 and oxygen 22 (or some other oxidizer, e.g., air) at elevated pressures, e.g., from approximately 20 bar to 85 bar, and elevated temperatures, e.g., approximately 700 degrees Celsius C to 1600 degrees C., depending on the type of gasifier 24 utilized. The gasifier 24 may be an updraft or downdraft fixed-bed gasifier, a fluidized-bed gasifier, such as a bubbling fluidized-bed gasifier or a circulating fluidized-bed gasifier, or moving-bed gasifier, or some other type of gasifier. During the gasification process, the feedstock 18 may undergo a pyrolysis process, whereby the feedstock 18 is heated. Temperatures inside a gasification chamber of the gasifier 24 may range from approximately 150 degrees C. to 700 degrees C. during the pyrolysis process, depending on the fuel 14 from the fuel source 12 utilized to generate the feedstock 18.

The volatiles generated during the pyrolysis process, also known as devolatilization, may be partially combusted by introducing an oxidant (e.g., oxygen 22) to the gasifier 24. The volatiles may react with the oxygen 22 to form $CO_2$ and CO in combustion reactions, which provide heat for the subsequent gasification reactions. The temperatures generated by the partial combustion reactions may range from approximately 700 degrees C. to 1600 degrees C. Steam 27 may be introduced into the gasifier 24 during a gasification step, depending on the embodiment. The char may react with the $CO_2$ and steam to produce CO and hydrogen at temperatures ranging from approximately 800 degrees C. to 1100 degrees C. In essence, the gasifier 24 utilizes steam 27 and oxygen 22 to allow some of the feedstock 18 to be partially oxidized to produce CO and release energy, which drives a second reaction that converts further feedstock to hydrogen and additional $CO_2$.

In this way, the gasifier 24 manufactures a resultant gas (e.g., syngas 26). This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas 26, because it includes, for example, $H_2S$. The gasifier 24 may also generate waste, such as slag 28, which may be a wet ash material. This slag 28 may be removed during cooling of the untreated syngas in a syngas cooler, e.g., a radiant syngas cooler (RSC) 30 (e.g., syngas cooler portion). The RSC 30 may include features that may facilitate cooling of the syngas 26 as it flows within the RSC 30 and increase cooling efficiency. Additionally, the RSC 30 (e.g., syngas cooler portion) may be integrated into a vessel (e.g., an integrated vessel 32) with the gasifier 24 (e.g., gasifier portion). In other words, the RSC 30 and the gasifier 24 may be integrated into the same integrated vessel 32, where the integrated vessel 32 may be a common vessel, a single vessel, or a one piece vessel. As such, the RSC 30 may include features that extend into the gasifier 24. The features extending from the RSC 30 into the gasifier 24 may facilitate cooling of the syngas 26 as it flows within both the gasifier 24 and the RSC 30. For example, in the gasifier 24 and/or RSC 30 (e.g., in the integrated vessel 32), a flow pattern of the syngas 26 through tubes that extend from the RSC 30 portion of the integrated vessel 32 into the gasifier 24 portion of the integrated vessel 32 may contribute to the overall cooling efficiency of the integrated vessel 32. It should be noted that any reference to the integrated vessel 32 may also be a reference to an integrated gasifier 24 and RSC 30, e.g., a gasification-cooling unit 32. Thus, the flow pattern of the syngas 26 within the integrated vessel 32 may be influenced by the configuration of the platen tubes 70 and membrane tubes 130 in the integrated vessel 32. Accordingly, in certain embodiments, the integrated vessel 32 may include structural features that may alter the flow pattern of the syngas 26 within the integrated vessel 32, as will be discussed below with reference to the remaining figures. Generally, the flow pattern of the syngas 26 may increase convective and/or radiative heat transfer of the syngas 26 within the integrated vessel 32. In other embodiments, the RSC 30 may include cooling tubes that extend into the gasifier 24, as previously described (e.g., the cooling tubes may be located within the integrated vessel 32), that may cool the syngas 26 via convective and/or radiant heat transfer with a coolant 34 flowing through the cooling tubes. A gas treatment unit or gas purifier 36 may be utilized to treat the syngas 26 exiting the integrated vessel 32. In one embodiment, the gas purifier 36 may include a water gas shift reactor. The gas purifier 36 may scrub the syngas 26 to remove the HCl, HF, COS, HCN, and $H_2S$ from the syngas 26, which may include separation of sulfur 38 in a sulfur processor 40. Furthermore, the gas purifier 36 may separate salts 42 from the syngas 26 via a water treatment unit 44 that may utilize water purification techniques to generate usable salts 42 from the syngas 26. Subsequently, the gas passed through the gas purifier 36 may include treated syngas 46 (e.g., the sulfur 38 has been removed from the syngas), with trace amounts of other chemicals, e.g., $NH_3$ (ammonia) and $CH_4$ (methane).

In some embodiments, a residual gas processor may be utilized to remove additional residual gas components, such as ammonia and methane, as well as methanol or any residual chemicals from the treated syngas. However, removal of residual gas components from the treated syngas 46 is optional, because the treated syngas 46 may be utilized as a fuel even when it includes the residual gas components, e.g., tail gas.

The treated syngas 46, which has undergone removal of its sulfur containing components and a large fraction of its carbon dioxide, may be transmitted to a power block 48. For example, the power block 48 may include a combustor of a gas turbine engine, which may utilize the treated syngas 46 as combustible fuel. The gas turbine engine may drive a load, such as an electrical generator for producing electrical power. In certain embodiments, the power block 48 may also include a heat recovery steam generator (HRSG). The HRSG may utilize steam 50 produced by the RSC 30 portion and the gasifier 24 portion of the integrated vessel 32 as described above. Additionally, the HRSG may supply the coolant 34 to the RSC 30 (e.g., the integrated vessel 32). In the integrated vessel 32, the coolant 34 flows through tubes to generate the steam 50 as described above. However, it should be noted that the coolant may come from a source other than the HRSG in the power block 48. For example, the IGCC system 10 may include other components, such as a boiler feedwater pump, that supply the coolant to the integrated vessel 32 from another source. In certain embodiments, the HRSG may also provide steam 27 to the gasifier 24, which may be utilized during the gasification process as described above. Additionally, the HRSG may provide steam to a steam turbine engine for power generation, e.g., an electrical generator driven by a steam turbine.

Figure 2:
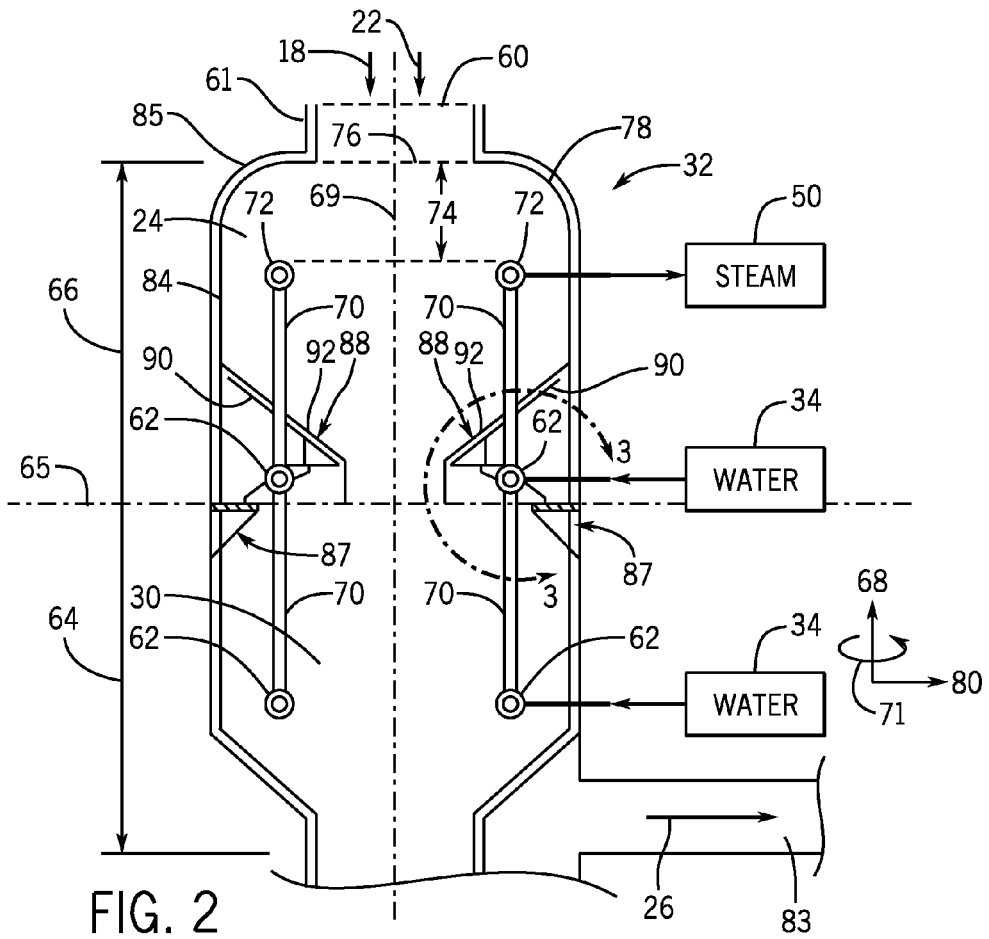
FIG. 2 is a cross-sectional view of an embodiment of an integrated vessel of the gasification system of FIG. 1 having a gasifier portion and a syngas cooler portion.

Turning now to FIG. 2, an embodiment of the integrated vessel 32 of the gasification system 10 having the RSC 30 and the gasifier 24 portions is shown. In the illustrated embodiment, the integrated vessel 32 is substantially cylindrical in shape. The gasifier 24 is disposed proximate the RSC 30 (e.g., above the RSC 30) in the integrated vessel 32. Oxygen 22 and fuel 14 (e.g., the feedstock 18) are received through a top 60 of the integrated vessel 32 and mixed to form a mixture, and the mixture is subject to elevated temperatures (e.g., approximately 700 degrees Celsius C to 1600 degrees C.) and elevated pressures (e.g., approximately 20 bar to 85 bar) in the gasifier 24, as described above, to form syngas 26. It should be noted that the oxygen 22 and fuel 14 may be received through some other area of the gasifier 24 portion of the integrated vessel 32. For example, in another embodiment, the oxygen 22 and fuel 14 (e.g., the feedstock 18) may be routed through openings in a circumferential side 61 of the integrated vessel 32. In either configuration, the oxygen 22 and fuel 14 or feedstock 18 enters the gasifier 24 portion of the integrated vessel 32 to form the mixture for generating syngas 26.

Coolant 34 (e.g., water) may be routed from an external source (e.g., a HRSG) to one or more intake headers 62 in the integrated vessel 32, which each curve in an arcuate manner within the integrated vessel 32 (e.g., circumferentially 71 around the integrated vessel 32). In the illustrated embodiment, one of the intake headers 62 is located in a lower portion 64 (e.g., at or below a midpoint 65 of the integrated vessel 32) of the integrated vessel 32 and another of the intake headers 62 is located in an upper portion 66 of the integrated vessel 32 (e.g., at or above the midpoint 65 of the integrated vessel 32). In some embodiments, all of the intake headers 62 may be located in the lower portion 64 or all of the intake headers 62 may be located in the upper portion 66. In other words, the coolant 34 may be imported, from one or more coolant 34 sources, into the integrated vessel 32 at different points along a longitudinal axis 69 with respect to the integrated vessel 32, and the location of the intake headers 62 along the longitudinal axis 69 may depend on various factors of the integrated vessel 32 and the gasification system 10 as a whole (e.g., desired state of steam output), which will be described in detail below. Additionally, the intake headers 62 may each form a ring, centered about longitudinal axis 69, in the integrated vessel 32.

Continuing with FIG. 2, the coolant 34 is routed through the integrated vessel 32 generally in direction 68 (e.g., in a direction generally opposite to the flow of syngas 26 through the integrated vessel 32) via platen tubes 70. The platen tubes 70 may extend upwardly in direction 68 and may be disposed annularly around, and connected to, the intake headers 62, such that the coolant 34 is distributed circumferentially 71 (e.g., about the longitudinal axis 69) and evenly through the platen tubes 70 in the integrated vessel 32. In other words, the coolant 34 may enter into the intake headers 62 at one or multiple circumferentially 71 symmetrical points and may be distributed around the intake headers 62, such that the platen tubes 70 disposed annularly around the intake headers 62 each transmit substantially equal portions of the coolant 34 as described below.

The coolant 34 may extract heat from the syngas 26 (e.g., the syngas 26 produced in the upper portion 66 of the integrated vessel 32, or the gasifier 24 portion, as described above). Accordingly, the coolant 34 is heated and expands, causing the coolant 34 to rise through the platen tubes 70 generally in direction 68. Simultaneously, the syngas 26 loses heat and is routed downward within the integrated vessel 32 outside of the platen tubes 70, generally opposite of direction 68, toward the lower portion 64 of the integrated vessel 32. It should be noted that heat exchange between the syngas 26 and the coolant 34 may include radiant heat transfer, convective heat transfer, or a combination of the two, and that variations in the type of heat transfer that occurs in the integrated vessel 32 would not be considered as materially departing from the present disclosure to one of ordinary skill in the art.

As the coolant 34 expands, it may rise through the platen tubes 70 into the upper portion 66 of the integrated vessel 32. Additional coolant 34 may be imported into the integrated vessel 32 through an additional intake header 62 (e.g., near midpoint 65 and in the upper portion 65). As previously described, the intake header 62 in the illustrated embodiment forms a ring, centered about longitudinal axis 69, such that the coolant 34 is distributed evenly circumferentially 71 about the integrated vessel 32. The additional coolant 34 may be pre-heated before entering the intake header 62 above the midpoint 65 of the integrated vessel 32, such that the state and thermal characteristics of the additional coolant 34 corresponds to the characteristics of the coolant 34 entering the intake header 62 rising from the platen tubes 70 below. The platen tubes 70 may route the heated coolant 34 upwardly in direction 68 into the gasifier 24 portion of the integrated vessel 32 (e.g., into portions of the platen tubes 70 that are disposed within the gasifier 24 portion of the integrated vessel 32). Accordingly, the coolant 34 may extract heat from the syngas 26 in the lower portion 64 and the upper portion 66 of the integrated vessel 32 (e.g., in the RSC 30 portion and the gasifier 24 portion of the integrated vessel 32). As such, the platen tubes 70 may have an increased length in direction 68 within the integrated vessel 32 for increased heat extraction and, thus, increased heat exchange efficiency over a gasification system with a separate RSC 30 and gasifier 24, without increasing the length of the RSC 30. Additionally, as previously described, the platen tubes 70 may extend through both the RSC 30 portion and the gasifier 24 portion. In other words, the platen tubes 70 may be a shared element between the RSC 30 and the gasifier 24 (e.g., the syngas cooler portion and the gasifier portion). The platen tubes 70 may extend through approximately 40 to 100 percent, 50 to 90 percent, or 60 to 80 percent of the overall length of the integrated vessel 32. In certain embodiments, the platen tubes 70 may extend continuously across all stages of the integrated vessel 32 (e.g., the RSC 30 and the gasifier 24).

Continuing with FIG. 2, the coolant 34 may rise in direction 68 through the platen tubes 70 and reach an output header 72. The output header 72 may be located at an offset 74 along the longitudinal axis 69 from a top 76 of a curved annular refractory portion 78 of the integrated vessel 32. The offset 74 may correspond to a desired distance from the top 76 of the curved annular refractory portion 78 of the integrated vessel 32 based on various considerations (e.g., thermal considerations). For example, the offset 74 may be partially determined based on a material selected for the output header 72, such that the output header 72 is not significantly affected by a flame used near the top 60 of the gasifier 26 portion.

In general, the output header 72 may be located in the upper portion 66 of the integrated vessel 32. The output header 72 may extend circumferentially 71 about longitudinal axis 69 and may be configured to receive the coolant 34 and export the coolant 34 out of the integrated vessel 32 in direction 80 to other portions of the gasification system 10. In the illustrated embodiment, the coolant 34 exiting the integrated vessel 32 has extracted heat from the syngas 26 and, thus, may be at least partially or entirely in the form of steam 50. In the illustrated embodiment, the steam 50 is exported via a single or multiple circumferentially 71 symmetrical conduits in direction 80. In another embodiment, the steam 50 may be exported from the integrated vessel 32 through a number of different conduits connected to the output header 72 and disposed circumferentially 71 about the integrated vessel 32 (e.g., centered about longitudinal axis 69). In other words, each conduit connected to the output header 72 and configured to export steam 50 from the integrated vessel 32 may extend radially outward away from longitudinal axis 69.

In the illustrated embodiment, however, the steam 50 is exported through either a single opening or multiple circumferentially 71 symmetrical openings in the output header 72 in direction 80. The steam 50 may be a two-phase saturated steam, or, in certain embodiments, the steam 50 may be a superheated steam. Because the platen tubes 70 extend into the gasifier 24 portion of the integrated vessel 32, the coolant 34 may extract more heat compared to a gasification system including a separate RSC 30 and gasifier 24. As such, the integrated vessel 32 may produce superheated steam. The steam 50 may be exported from the output headers 72 to an HRSG or some other component of the gasification system 10. Additionally, the syngas 26 may be exported through a syngas export conduit 83 to another portion of the gasification system 10 as described above.

In the illustrated embodiment, the integrated vessel 32 may include a multi-walled structure including an inner wall 84 and an outer wall 85 in a coaxial arrangement. The inner wall 84 may be substantially cylindrical in shape (e.g., extend circumferentially 71 about longitudinal axis 69) and may be a heat resistant refractory, which may assist routing the syngas 26 through the integrated vessel 32 toward the syngas export conduit 83.

Further, one or more of the intake headers 62 may be supported via a lower support ring assembly 87 that is coupled (e.g., via welding, brazing, adhesive, fasteners, etc.) to the outer wall 85, depending on the embodiment, and extends circumferentially 71 about the cylindrical integrated vessel 32. In some embodiments, the lower support ring assembly 87 may extend circumferentially 71 around only a portion of the cylindrical integrated vessel 32. In the illustrated embodiment, the intake header 62 located near the midpoint 65 of the integrated vessel 32 may be supported by the lower support ring assembly 87 located below the intake header 62. A portion of the lower support ring assembly 87 may extend through an aperture in the inner wall 84, such that the portion of the lower support ring assembly 87 may contact and couple to the outer wall 85. The aperture in the inner wall 84 may be configured to accommodate the lower support ring assembly 87 and swelling of the lower support ring assembly 87 due to thermal expansion. An upper support ring assembly 88 may also be used to support a gasifier throat plate 90 or a tapered refractory portion 92 of the gasifier 24 portion of the integrated vessel 32, or both.

Figure 3:
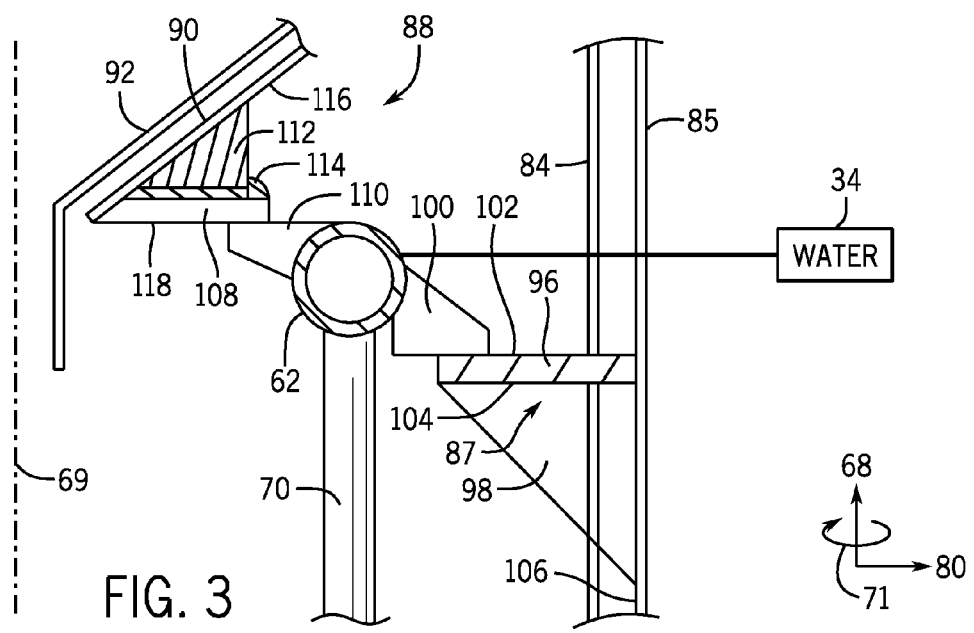
FIG. 3 is a perspective view of an embodiment of a support ring assembly of an integrated vessel of the gasification system of FIG. 1 taken along line 3-3 of FIG. 2.

Portions of an embodiment of the lower support ring assembly 87, the outer wall 85, the inner wall 84, the upper support ring assembly 88, and the gasifier throat plate 90 taken along line 3-3 of FIG. 2 is illustrated in FIG. 3. The lower ring assembly 87 may include a lower ring 96, a lower support lug 98, and an upper support lug 100. The upper support lug 100 may be coupled directly to the intake header 62 (e.g., via welding, brazing, adhesive, fasteners, etc.). Additionally, the upper support lug 100 may be disposed in contact with an upper surface 102 of the lower ring 96. In one embodiment, the upper support lug 100 may also be coupled to the upper surface 102 of the lower ring 96 (e.g., via welding, brazing, adhesive, fasteners, etc.). In another embodiment, the upper support lug 100 may not be coupled to the upper surface 102 of the lower ring 96, which may enable more efficient thermal expansion of the intake header 62, upper support lug 100, or other components in the lower support ring assembly 87 (e.g., reducing the possibility of thermal stress and/or fatigue). The lower support lug 98 may be coupled directly to a bottom surface 104 of the lower ring 96, as well as to an inner surface 106 of the outer wall 85 (e.g., via welding, brazing, adhesive, fasteners, etc.). The lower support ring assembly 87 may extend through an aperture in the inner wall 84, as previously described, said aperture configured to allow thermal expansion of the lower support ring assembly 87. In other words, lower ring 96 may extend from the outer wall 85 of the integrated vessel 32 through an aperture in the inner wall 84, in which case the lower support lug 98 may also extend through the inner wall 84 and be welded directly to the inner surface 106 of the outer wall 85. In another embodiment, as will be described in later figures of the present disclosure, the inner wall 84 may not be present below the gasifier throat plate 90, in which case the lower support ring assembly 87 may still couple to the outer wall 85, but without extending through an aperture of the inner wall 84. Any combination or variations of the different embodiments described above regarding the lower support ring assembly 87 are presently contemplated.

Further, the illustrated embodiment includes an upper support ring assembly 88 for supporting the gasifier throat plate 90 above the intake header 62. The upper support ring assembly 88 includes an upper ring 108, a lower support lug 110, and an upper support lug 112. The upper support lug 112 may be coupled to a top surface 114 of the upper ring 108 and an outer surface 116 of the gasifier throat plate 90 (e.g., via welding). The lower support lug 110 may be coupled to the intake header 62 and a bottom surface 118 of the upper ring 108 (e.g., via welding). However, in order to enable efficient thermal expansion in a similar manner as the lower support ring assembly 87 (see above), the upper support lug 112 and the lower support lug 110 of the upper support ring assembly 88 may not be coupled via all the surfaces described above. For example, the upper support lug 112 of the upper support ring assembly 88 may not be welded or otherwise coupled to the top surface 114 of the upper ring 108, thereby reducing the possibility of thermal stress and/or fatigue in the components (e.g., the upper support lug 112).

As previously described, the integrated vessel 32 having the gasifier 24 and the RSC 30 may include a number of embodiments, and different embodiments may have varying features regarding the inner and outer walls 84, 85, the number and location of coolant 34 intake headers 62, and the configuration of support ring assemblies, among others. For example, an embodiment of the integrated vessel 32 is illustrated in FIG. 4 having the inner wall 84 and membrane tubes 130 (e.g., in the lower portion 64 of the integrated vessel 32, in place of the inner wall 84).

Figure 4:
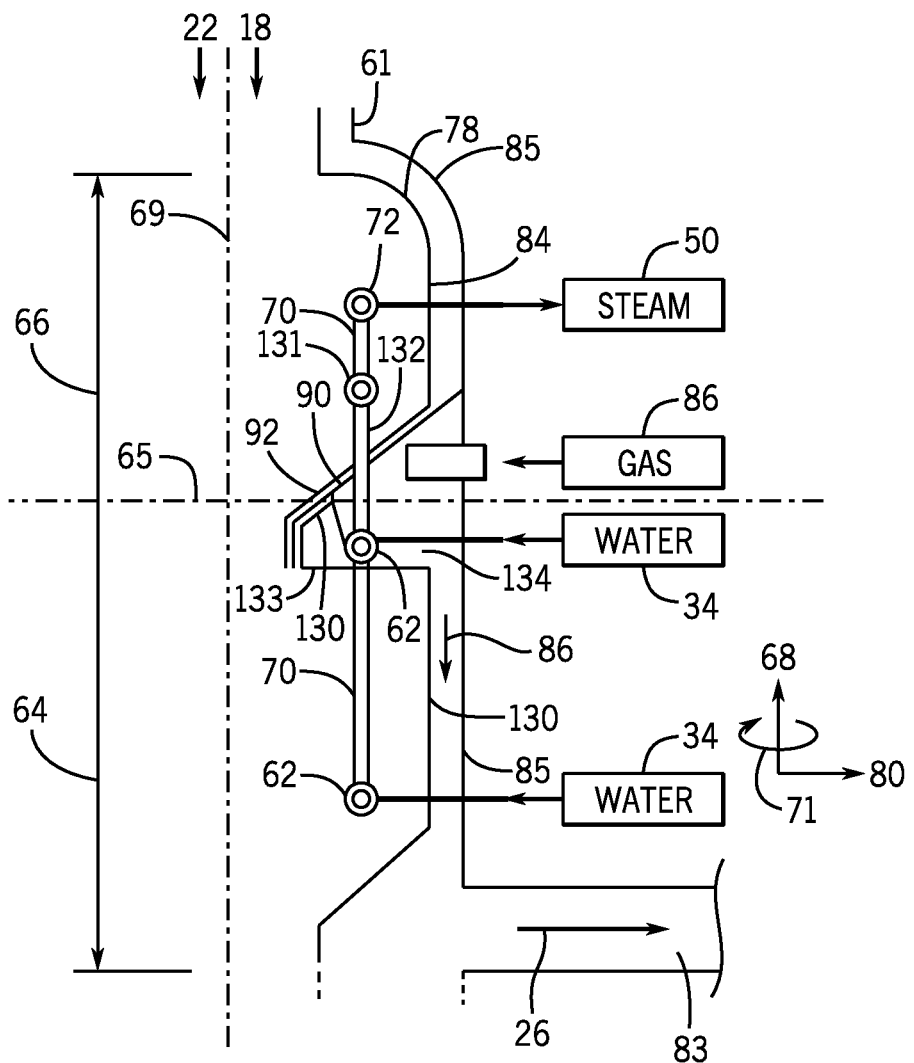
FIG. 4 is a cross-sectional view of an embodiment of a portion of an integrated vessel of the gasification system of FIG. 1.

In the illustrated embodiment of FIG. 4, a partial cross-sectional view of the integrated vessel 32 (e.g., to the right of longitudinal axis 69), the lower portion 64 of the integrated vessel 32 includes two intake headers 62 connected via platen tubes 70, each extending circumferentially 71 around the integrated vessel 32. The coolant 34 (e.g., water) enters the integrated vessel 32 through the intake header 62 located adjacent to the syngas export conduit 83. The coolant 34 is heated by the syngas 26 in the lower portion 64 of the integrated vessel 32 and rises generally upward in direction 68. More coolant 34 may enter the integrated vessel 32 via the header 62 located near the midpoint 65 of the integrated vessel 32. The coolant 34 entering the header 62 located near the midpoint 65 of the integrated vessel 32 may be pre-heated and/or expanded to a degree and state similar to that of the coolant 34 entering the header 62 from the platen tubes 70 below (e.g., after being heated to an extent by the syngas 26). The coolant 34 from the platen tubes 70 in the lower portion 64 of the integrated vessel 32 may combine with the coolant 34 entering through the intake header 62 near the midpoint 65, where the combined coolant 34 may be further heated by the syngas 26 and rise through the platen tubes 70 into the upper portion 66 of the integrated vessel 32. The upper portion 66 of the integrated vessel 32 may include one or more intermediate headers 131 that may or may not operate as intake or output headers, depending on the embodiment. The intermediate header 131 may be connected to the intake header 62 near the midpoint 65 of the integrated vessel 24 via interconnecting pipes 132, such that the interconnecting pipes 132 may be a portion of the platen tubes 70 between the intermediate header 131 and the intake header 62. The intermediate header 131 may be used to circumferentially 71 connect the platen tubes 70 transmitting the coolant 34 upwards, such that the intermediate header 131 receives the coolant 34 from the interconnecting pipes 132 and circumferentially 71 distributes the coolant 34 evenly about the intermediate header 131 and to the platen tubes 70 (e.g., such that each platen tube 70 transmits an equal portion of the coolant 34 upwards in direction 68). Further, the intermediate headers 131 may include other functions, such as assisting separation of steam from the coolant 34 and transmitting the steam out of the integrated vessel 32. These functions will be discussed in detail below (with reference to FIG. 5).

The upper portion 66 of the integrated vessel 32, in the illustrated embodiment in FIG. 4, includes the inner wall 84 and the outer wall 85. The inner wall 84 in the upper portion 66 of the integrated vessel 32 may include heat resistant refractory metal. However, the lower portion 64 may include membrane tubes 130 in place of the inner wall 84. For example, the membrane tubes 130 may receive a portion of the coolant 34 from the inlet that supplies the coolant 34 to the intake header 62 (e.g., located adjacent to the syngas export conduit 83). In other words, the inlet may supply the coolant 34 to both the platen tubes 70 and the membrane tubes 130 in the lower portion 64 of the integrated vessel 32, and the platen tubes 70 and the membrane tubes 130 may then route the coolant 34 generally upwards in direction 68. The membrane tubes 130 may also route the coolant 34 radially inwards toward the longitudinal axis 69, as indicated by membrane tube portion 133. The membrane tubes 130 may then route the coolant 34 along a trapezoidal path from the membrane tube portion 133 to the intake header 62 (e.g., located near the midpoint 65 of the integrated vessel 32). Additionally, the membrane tubes 130 together with the outer wall 85 of the integrated vessel 32 and the gasifier throat plate 90 may seal an outer portion 134 of the integrated vessel 32. A sealant gas 86 may be injected into the portion of the integrated vessel 32 that is sealed by the gasifier throat plate 90, the membrane tubes 130, and the outer wall 85, as illustrated in FIG. 4. Thus, the sealant gas 86 may be routed downward, opposite direction 68, between the membrane tubes 130 and the outer wall 85 of the integrated vessel 32. Because the inner wall 84 of the upper portion 66 of the integrated vessel 32 includes refractory metal and may be sealed, the sealant gas 86 may be injected directly into the lower portion 64 of the integrated vessel 32 (e.g., at the midpoint 65 of the integrated vessel 32 and directed downward, opposite direction 68, as described above). Additionally, the sealant gas 86 may act as a barrier for sealing the inner wall 84 of the integrated vessel 32, such that the syngas 26 may not escape radially outward away from the longitudinal axis 69 beyond the inner wall 84. The outer wall 85 may act as a protective barrier to reduce the likelihood that an external load damages the integrated vessel 32 and the components described above inside the integrated vessel 32.

Figure 5:
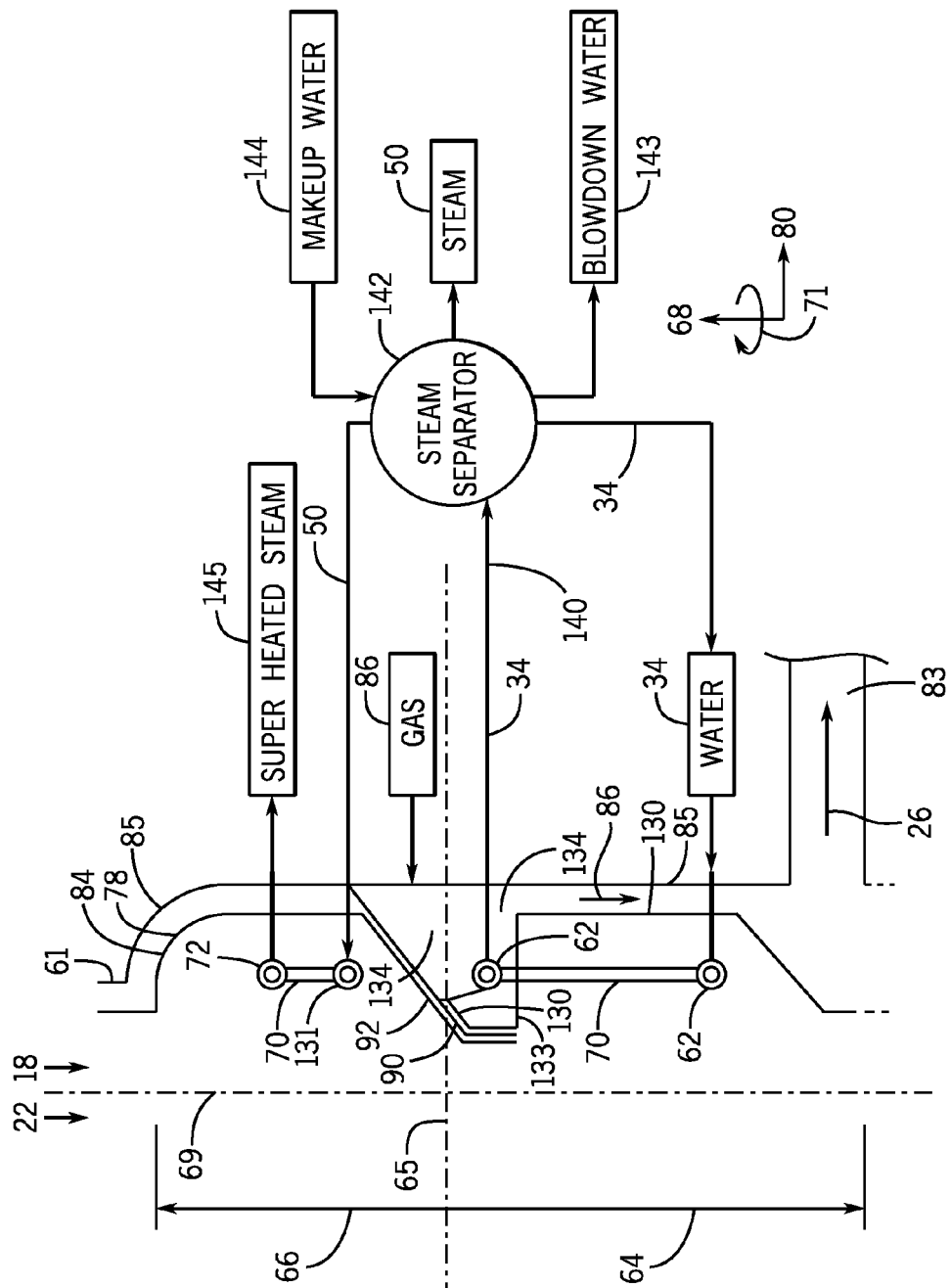
FIG. 5 is another cross-sectional view of an embodiment of a portion of an integrated vessel of the gasification system of FIG. 1.

In the embodiment illustrated in FIG. 5, a partial cross-sectional view of the integrated vessel 32 (e.g., to the right of longitudinal axis 69), the coolant 34 flowing from the intake header 62 located adjacent to the syngas export conduit 83 through platen tubes 70 may enter the intake header 62 located near the midpoint 65 of the integrated vessel 32. Here, the coolant 34 may be exported through conduit 140 to a steam separator 142. The coolant 34 may be separated into steam 50 (e.g., saturated steam) and coolant 34 (e.g., liquid coolant). The steam 50 (e.g., saturated steam), in the illustrated embodiment, is routed back to the integrated vessel 32 and into the intermediate header 131 for further heating. In some embodiments, part of the steam 50 (e.g., saturated steam) may be exported from steam separator 142 to other portions of the gasification system 10, such as a HRSG, as previously described. In the illustrated embodiment, a portion or all of the coolant 34 may be routed from the steam separator 142 to mix with coolant 34 and be supplied to header 62 located adjacent to the syngas export conduit 83 (e.g., in the lower portion 64). Further, the steam separator 142 may include a water blowdown outlet 143 and a water make up inlet 144. The water blow down outlet 143 may reject a portion of water in the steam separator 142 to remove impurities, and the water make up inlet 144 may supply treated water to the steam separator 142 to continue steam production (e.g., by replacing impure water rejected through the water blow down outlet 143).

Additionally, as described above, steam 50 from the steam separator 142 may enter into the intermediate header 131, as shown in the illustrated embodiment. The steam 50 is heated via the syngas 26 in the upper portion 66 of the integrated vessel 32 and may become superheated steam 145 en route to the output header 72. Thus, superheated steam 145 may be exported from the output header 72 for use in other areas of the gasification system 10 or some other system. In the illustrated embodiment, for clarity, none of the support ring assemblies are shown. However, any of the support ring assemblies described in other embodiments in accordance with the present disclosure may be used to support the intake headers 62, the intermediate header 131, the output header 72, or any combination thereof.

Figure 6:
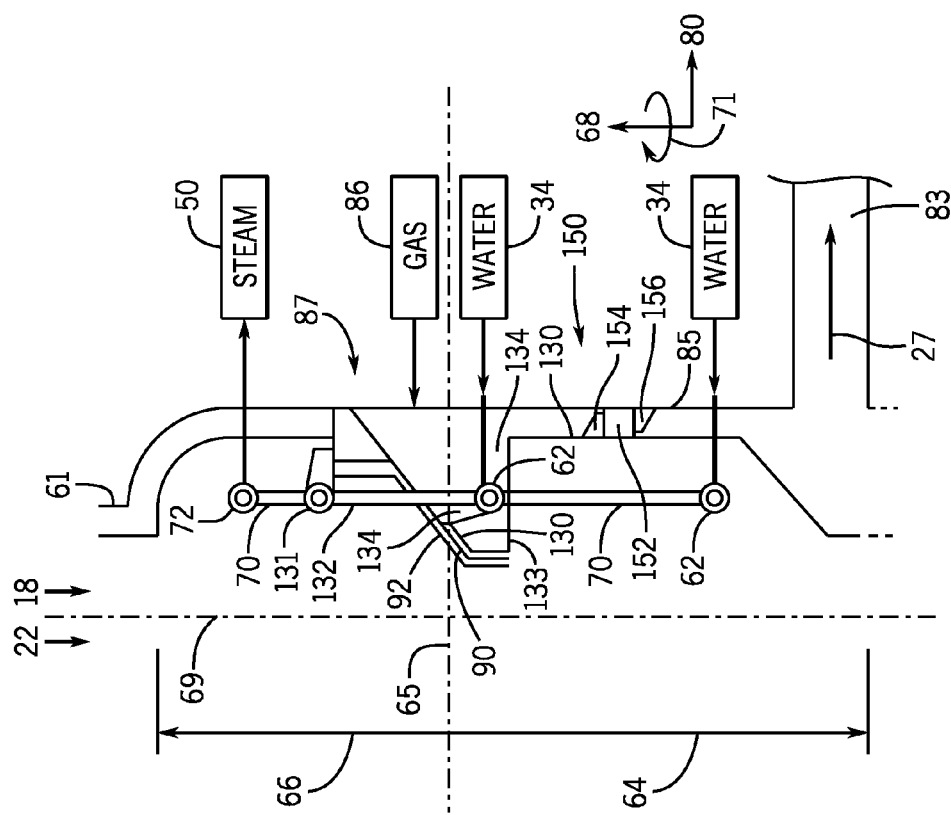
FIG. 6 is another cross-sectional view of an embodiment of a portion an integrated vessel of the gasification system of FIG. 1.

In FIG. 6, a partial cross-sectional view of an embodiment of the integrated vessel 32 (e.g., to the right of longitudinal axis 69) is illustrated. The integrated vessel 32 includes an annular support ring assembly, in this case a lower support ring assembly 87, in support of the intermediate header 131 (e.g., the intermediate header 131 and the intake header 62 may not be directly coupled). The lower support ring assembly 87 may operate in the same manner as the lower support ring assembly 87 described with reference to FIG. 3, but in this case in support of a different header (e.g., the intermediate header 131). It should be noted that the lower support ring assembly 87 and/or the upper support ring assembly 88 may be used to support any of the intake headers 62, intermediate headers 131, or output headers 72. Further, as shown in FIG. 6, a tube support ring assembly 150 may be used to support either the membrane tubes 130, as shown, or the platen tubes 70, or both. The tube ring assembly 150 may include a ring 152, an upper support lug 154 and a lower support lug 156, which may be configured to support the tube in the same manner as the upper and lower support ring assemblies 86, 87 previously described.

Figure 7:
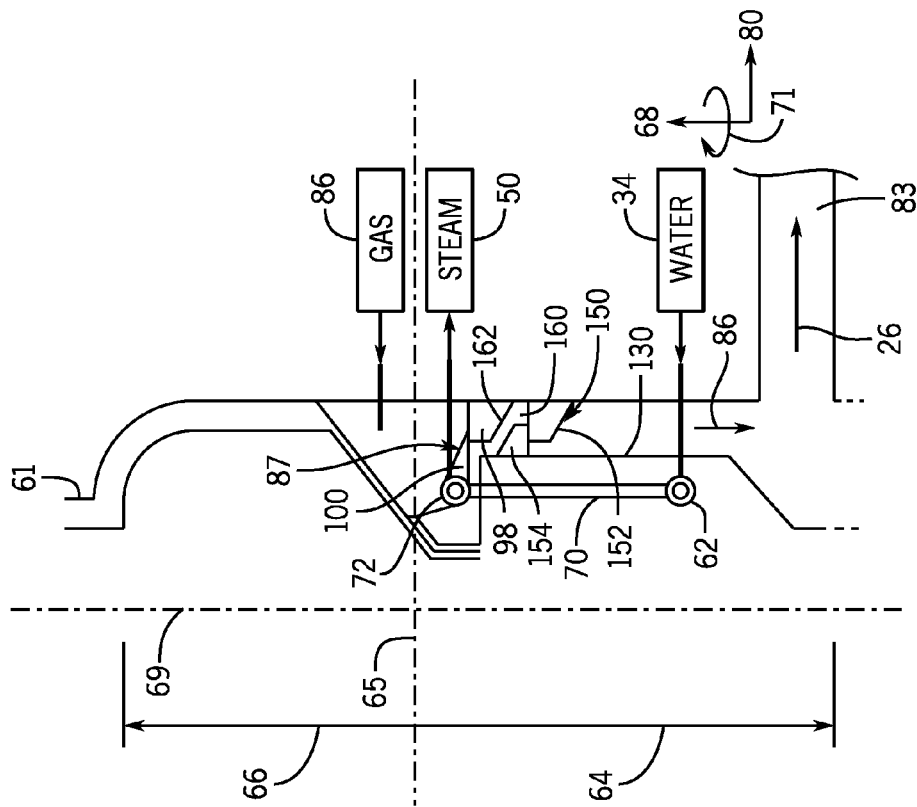
FIG. 7 is another cross-sectional view of an embodiment of a portion an integrated vessel of the gasification system of FIG. 1.

An additional embodiment, shown in FIG. 7, a partial cross-sectional view of the integrated vessel 32 (e.g., to the right of longitudinal axis 69), includes the integrated vessel 32 that houses the RSC 30 and the gasifier 24 one on top of the other. In the illustrated embodiment, the platen tubes 70 do not extend into the gasifier 24 portion of the integrated vessel 32. In this embodiment, as previously described, the output header 72 may not be located in the upper portion 66 of the integrated vessel 32. The output header 72 may be located near, above, or below the midpoint 65 of the integrated vessel 32. The illustrated embodiment includes only one intake header 62, located adjacent to the syngas export conduit 83. The coolant 34 is received into the intake header 62 and transmitted via the platen tubes 70 toward the output header 72, generally in direction 68. Also, coolant 34 is transmitted upwardly in direction 68 via the membrane tubes 130 from the intake header 62 to the output header 72. In this embodiment, the output header 72 and the membrane tubes 130 are supported via support ring assemblies. For example, the membrane tubes are supported via a tube support assembly 150, as previously described, and the output header 72 is supported by the lower support ring assembly 87, as described with respect to the intake headers 62 and intermediate headers 131 of previously described embodiments.

In summation, embodiments of the present disclosure are directed toward the gasification system 10 having the gasifier 24 and the RSC 30 integrated, one on top of the other (e.g., the gasifier 24 on top of the RSC 30), into a single integrated vessel 32. Further, the RSC 30 may include platen tubes 70 that extend into the gasifier 24 portion of the integrated vessel 32, such that heat transfer between the coolant 34 routed through the platen tubes 70 occurs both in the RSC 30 portion and the gasifier 24 portion of the integrated vessel (e.g., the lower portion 64 and the upper portion 66 of the integrated vessel 32). For example, the platen tubes may extend axially through the RSC portion 30, and the platen tubes 70 also may extend axially through at least 10, 20, 30, 40, 50, 60, 70, 80, 90, or 100 percent of the length of the gasifier portion 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an integrated vessel extending along a longitudinal axis, comprising:
a gasifier portion having a gasifier chamber;
a syngas cooler portion disposed axially adjacent to the gasifier portion along the longitudinal axis;
a plurality of platen tubes extending circumferentially about the longitudinal axis, wherein the plurality of platen tubes extends from the syngas cooler portion into the gasifier chamber and is configured to route coolant through the integrated vessel; and
a plurality of membrane tubes extending circumferentially about the longitudinal axis and disposed within the syngas cooler portion of the integrated vessel, wherein the plurality of platen tubes is concentric with the plurality of membrane tubes, and wherein the plurality of platen tubes is disposed radially inward from the plurality of membrane tubes with respect to the longitudinal axis.

2. The system of claim 1, wherein the plurality of platen tubes extend from a circumferential intake header disposed in the integrated vessel.

3. The system of claim 2, comprising a support ring assembly configured to support the intake header, wherein the support ring assembly includes a lug that is welded to the intake header.

4. The system of claim 1, comprising a support ring assembly configured to support a gasifier throat plate of the integrated vessel.

5. The system of claim 1, comprising a radially outer portion of the integrated vessel configured to route a sealant gas through the radially outer portion, wherein a first side of the radially outer portion comprises the plurality of membrane tubes.

6. The system of claim 5, comprising an outer wall of the integrated vessel, wherein a second side of the radially outer portion comprises the outer wall.

7. The system of claim 5, comprising a gasifier throat, wherein a third side of the radially outer portion comprises the gasifier throat plate.

8. The system of claim 1, wherein the gasifier portion of the integrated vessel is configured to generate syngas, the syngas is routed through the integrated vessel, and the plurality of platen tubes is configured to route coolant through the integrated vessel to extract heat from the syngas to produce steam.

9. The system of claim 8, wherein the steam comprises superheated steam.

10. A system, comprising:
a gasifier;
a syngas cooler disposed axially adjacent to the gasifier along a longitudinal axis;
a plurality of membrane tubes extending circumferentially about the longitudinal axis and disposed in the syngas cooler;
a plurality of platen tubes extending circumferentially about the longitudinal axis and disposed in the syngas cooler and the gasifier, wherein the plurality of platen tubes is concentric with the plurality of membrane tubes and disposed radially inward from the plurality of membrane tubes with respect to the longitudinal axis; and
a support ring assembly, wherein the support ring assembly is configured to support an intake header, and wherein the gasifier, the syngas cooler, and the support ring assembly are integrated into a common vessel.

11. The system of claim 10, comprising a radially outer portion of the common vessel configured to route a sealant gas through the radially outer portion, wherein a first side of the radially outer portion comprises the plurality of membrane tubes.

12. The system of claim 11, comprising an outer wall of the common vessel, wherein a second side of the radially outer portion comprises the outer wall.

13. The system of claim 11, comprising a gasifier throat plate, wherein a third side of the radially outer portion comprises the gasifier throat plate.

14. The system of claim 10, wherein the gasifier of the common vessel is configured to generate syngas, the syngas is routed through the common vessel, and the plurality of platen tubes is configured to route coolant through the common vessel to extract heat from the syngas to produce steam.

15. The system of claim 14, wherein the steam comprises superheated steam.

16. A method of manufacture, comprising:
integrating a gasifier in a first portion of a common vessel;
integrating a syngas cooler in a second portion of the common vessel axially adjacent to the first portion along a longitudinal axis of the common vessel;
providing membrane tubes disposed circumferentially about the longitudinal axis and within the second portion of the common vessel; and
providing platen tubes within the common vessel, concentric with the membrane tubes, and radially inward from the membrane tubes with respect to the longitudinal axis, wherein the platen tubes extend from the syngas cooler of the common vessel into the gasifier of the common vessel.

17. The method of claim 16, comprising providing an intake header of the common vessel, wherein the intake header is supported by a support ring assembly and configured to receive coolant.

18. The system of claim 17, comprising coupling a lug of the support ring assembly to the intake header, such that the intake header is supported by the support ring assembly.

19. The method of claim 18, wherein coupling of the lug of the support ring assembly to the intake header comprises welding the lug of the support ring assembly to the intake header.

20. The method of claim 16, comprising coupling a support ring assembly to a gasifier throat plate of the common vessel.

* * * * *